US012285815B2

(12) United States Patent
Uzel

(10) Patent No.: US 12,285,815 B2
(45) Date of Patent: Apr. 29, 2025

(54) RESISTANCE WELDING SYSTEM FOR NUT CONTROL

(71) Applicant: ALBAKSAN DIS TICARET VE PAZARLAMA A.S., Arnavutkoy/Istanbul (TR)

(72) Inventor: Oguz Uzel, Istanbul (TR)

(73) Assignee: ALBAKSAN DIS TICARET VE PAZARLAMA A.S., Arnavutkoy/Istanbul (TR)

( * ) Notice: Subject to any disclaimer, the term of this patent is extended or adjusted under 35 U.S.C. 154(b) by 730 days.

(21) Appl. No.: 17/622,281

(22) PCT Filed: Oct. 8, 2019

(86) PCT No.: PCT/TR2019/050842
§ 371 (c)(1),
(2) Date: Dec. 23, 2021

(87) PCT Pub. No.: WO2020/263199
PCT Pub. Date: Dec. 30, 2020

(65) Prior Publication Data
US 2022/0258273 A1    Aug. 18, 2022

(30) Foreign Application Priority Data

Jun. 28, 2019    (TR) .................................. 2019/09693

(51) Int. Cl.
*B23K 11/00*    (2006.01)
*B23K 11/25*    (2006.01)
*B23K 11/30*    (2006.01)

(52) U.S. Cl.
CPC .......... *B23K 11/0046* (2013.01); *B23K 11/25* (2013.01); *B23K 11/3054* (2013.01)

(58) Field of Classification Search
CPC . B23K 11/0046; B23K 11/25; B23K 11/3054; B23K 11/253
See application file for complete search history.

(56) References Cited

U.S. PATENT DOCUMENTS

| 5,493,093 A | 2/1996 | Cecil |
| 5,808,266 A | 9/1998 | Cecil |
| 6,020,569 A | 2/2000 | Cecil et al. |

OTHER PUBLICATIONS

Oguz, U., PCT/TR2019/050842, International Search Report, Jul. 27, 2020, 3 pages.
Oguz, U., PCT/TR2019/050842, Written Opinion, Jul. 27, 2020, 4 pages.

*Primary Examiner* — Robert G Bachner
(74) *Attorney, Agent, or Firm* — Rahman LLC

(57) ABSTRACT

The present invention relates to a resistance welding system for nut control; the resistance welding system uses a resistance welding method in the process of welding nuts to metal sheets; detects the situations of the parameters are in or out of tolerance values that the parameter can be nut lengths, nut inner diameter differences and acceptability of welding seam riser heights, by makes control them at the welding process and gives warning according to situation; enables automatic control to different types of nuts on a component in processes where multiple nuts are welded onto one component by maintaining a recipeable and sequential welding process via calling registered welding properties for the corresponding nut; it also relates to a resistance welding nut control system that prevents the operator from taking the wrong nut and loading it into the machine.

4 Claims, 5 Drawing Sheets

RESISTANCE WELDING SYSTEM FOR NUT CONTROL

TECHNICAL FIELD OF THE INVENTION

The present invention relates to a resistance welding system for nut control; the resistance welding system uses a resistance welding method in the process of welding nuts to metal sheets; detects the situations of the parameters are in or out of tolerance values that the parameter can be nut lengths, nut inner diameter differences and acceptability of welding seam riser heights, by makes control them at the welding process and gives warning according to situation; enables automatic control to different types of nuts on a component in processes where multiple nuts are welded onto one component by maintaining a recipeable and sequential welding process via calling registered welding properties for the corresponding nut; it also relates to a resistance welding nut control system that prevents the operator from taking the wrong nut and loading it into the machine.

BACKGROUND OF THE INVENTION

Today, there are many products made of sheet metal and are used. In order to assemble these metals in sheet metal, it is necessary to weld various nuts to specified points and resistance welding is generally used for this process.

Resistance welding used in many fields such as automotive sector, aerospace technologies, steel structures, manufacturing of steel components, manufacturing of precision devices, electrotechnics and machinery sectors; It is a jointing process made with the help of heat formed from the resistance of these parts against the electrical current passed through the metal parts. The parts are partially melted to create the necessary situation for welding, starting from the formation of this said situation, the electrical current is cut off and pressure is applied to the workpieces, under this said pressure, cooling is applied and this process provides welding joint which cannot be removed. Resistance welding is the general name of this process.

There are various problems encountered during the process of jointing nuts to metal sheets by means of resistance welding, and these problems are; situation there are no nuts at the welding points, situation that the nuts have the opposite position at the welding process, using of the nuts with different sizes than intended size, incorrect positioning of the nut and using of incorrect sheet metal. There are a number of products available on the market in order to solve the mentioned problems, Navi products of SMK, NVSG-NUTDETECT products of Cushway-Schmidt and some products of Doceram are examples. These products make control by measuring the distance of the ceramic pin, the ceramic pin is referring the nut to be welded to the metal sheet, these products do not use the method of measuring the upper electrode distance and this creates problems in case of welding of the successive double nuts. In order to solve this situation, an electric sensor with a manual adjustment is added to the upper electrode in the product named Navi, but the position of this sensor has to be adjusted manually by the operator when the nuts of different sizes are welded. Navi and Cushway-Schmidt products can only be used with rutile type electrode assembly and there isn't any possible connection to the projection table or fixture. Doceram products can be connected to the projection table, but the upper electrode distance cannot be measured. There is no sequential nut welding method feature in any of the previously registered recipe of mentioned products, if more than one nut is to be welded to a piece, it cannot be determined according to which dimensions each nut is to be controlled and which the welding program will weld the next nut in the welding machine.

A number of studies have been carried out to prevent errors in resistance welding processes; in a national patent application TR 2015/14955, "System for preventing the production of faulty parts, which controls the weld nuts welded to sheet metal parts" is mentioned. The mentioned structuring is about to: a feeding unit which provides required centering the required nuts as regardless of human/operator attention in the resistance welding process; optical ruler for checking measurements during welding process; the body consisting of a logical controller (PLC) which controls the said optical ruler and senses the nut-related information on the sheet metal part by means of appropriate software, and makes the system ready for the production of new parts; sensors that prevent operators from making mistakes during the process and can detect the status of all nuts on the part; welding control system with control unit consisting of locking cylinders that lock the system in case of failure.

As a result, the necessity of eliminating the deficiencies and disadvantages of the existing structures and applications in the present technique necessitated an improvement in the related technical field.

SUMMARY OF THE INVENTION

The present invention relates to a resistance welding system which provides nut control, which has been developed in order to eliminate the above-mentioned disadvantages and bring new advantages to the related technical field.

The present invention relates to a resistance welding system for nut control; the resistance welding system uses a resistance welding method in the process of welding nuts to metal sheets; detects the situations of the parameters are in or out of tolerance values that the parameter can be nut lengths, nut inner diameter differences and acceptability of welding seam riser heights, by makes control them at the welding process and gives warning according to situation; enables automatic control to different types of nuts on a component in processes where multiple nuts are welded onto one component by maintaining a recipeable and sequential welding process via calling registered welding properties for the corresponding nut; it also relates to a resistance welding nut control system that prevents the operator from taking the wrong nut and loading it into the machine.

The object of the present invention is; the upper electrode distance is measured linearly so that the nuts with the same internal diameters but different heights are distinguished when successive double nuts are applied.

Another object of the invention is; It is also possible to use the rutile type electrode assembly as well as to use the electrode assembly associated with the projection table, thereby ensuring that the force is matched to the central point in applications that are critical in flexibility.

Another object of the invention is; to provide a prescribed and sequential welding process, whereby in the processes where multiple nuts are welded onto a single piece, calling the registered welding process characteristics for the next nut, checking according to the registered measured values, and thus enabling an automatic control of the different types of nuts on the piece is to provide.

Another object of the invention is; during the welding process, the box of the type of next nut is opened automatically and the boxes of other nuts are kept in the closed position, so this prevents situations of taking the wrong nut from the wrong box and load the wrong nut into the machine by the operator.

Another object of the invention is to provide access to information such as; last welding cycle time; average cycle time during shifts; number of production in the last hour; hourly production average during shifts; total number of welding per shift; number of suitable and unsuitable welding; also the number of suitable and unsuitable welding nuts in the last week, last month, last three months and last year.

The structural and characteristic features and all advantages of the invention will be more clearly understood with the following detailed description, and therefore the evaluation should be made in view of this detailed description.

BRIEF DESCRIPTION OF THE FIGURES

Embodiments of the present invention briefly summarized above and discussed in more detail below can be understood by reference to the exemplary embodiments described in the accompanying drawings. It should be noted, however, that the accompanying drawings only illustrate the typical embodiments of the present invention and therefore, they will are not intended to limit the scope of the invention, since it may allow other equally effective embodiments.

Figure 1:
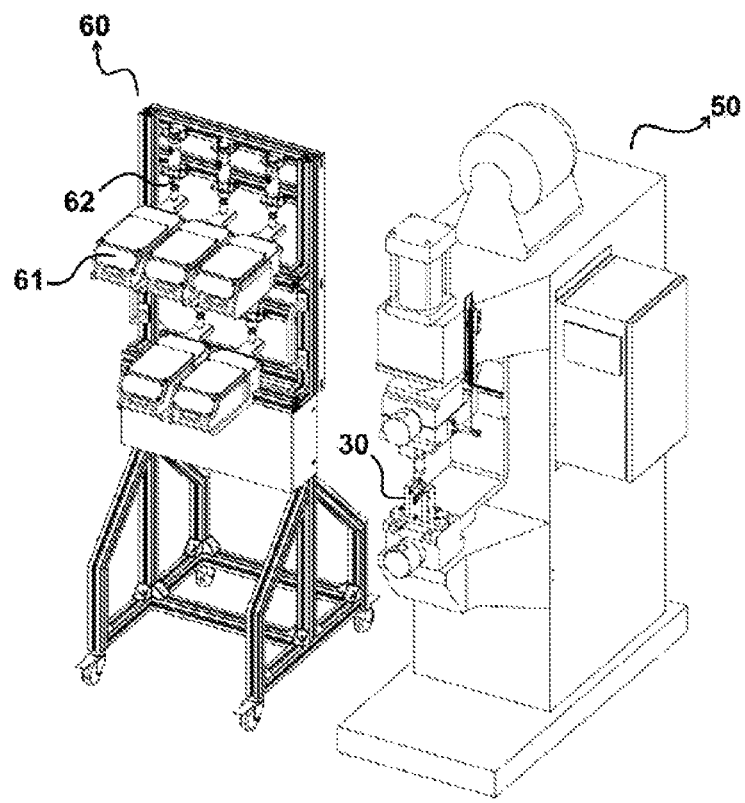
FIG. 1: A representative perspective view of the system according to the invention
Figure 2:
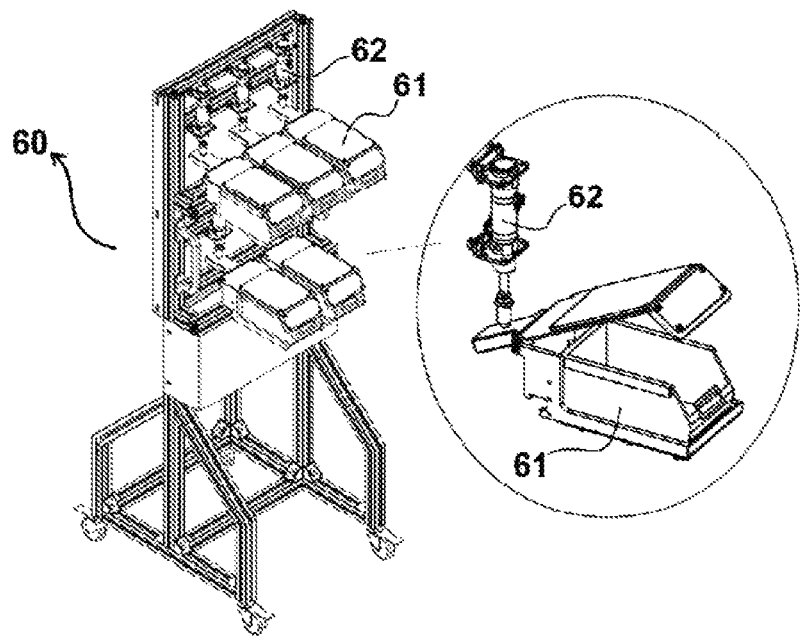
FIG. 2: A representative perspective view of the nut supply unit included in the system according to the invention
Figure 3:
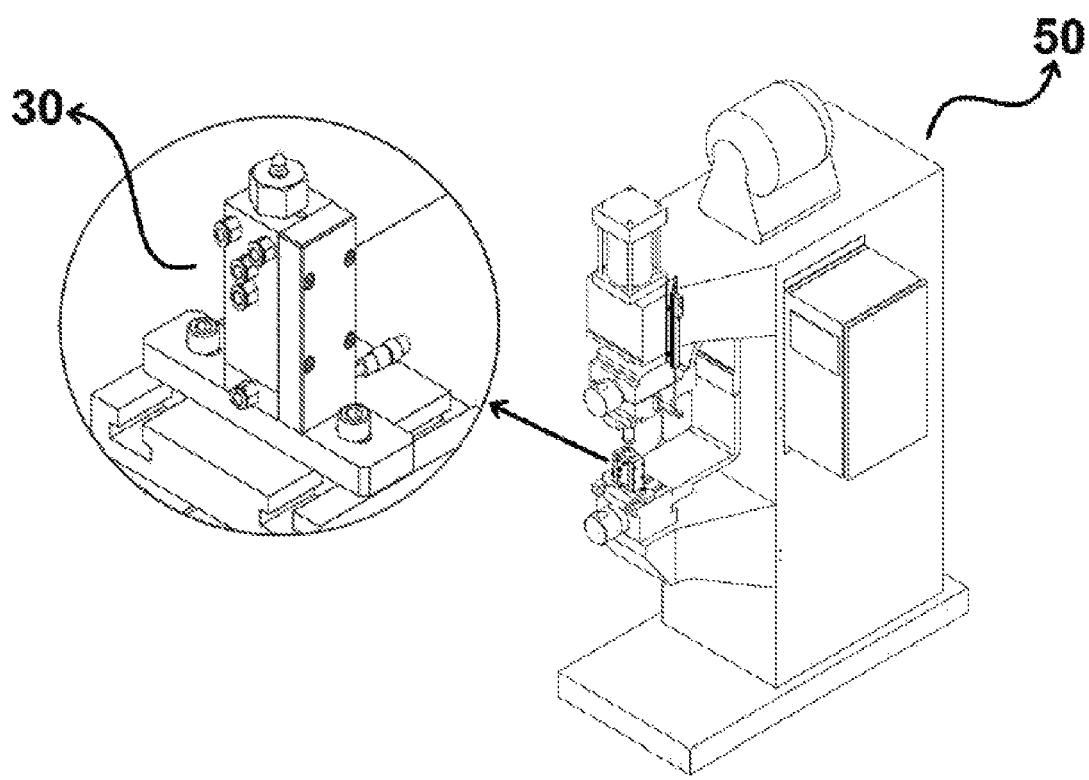
FIG. 3: A representative perspective view of a resistance welding machine comprising the electrode assembly associated with the projection table according to the system of the present invention.
Figure 4:
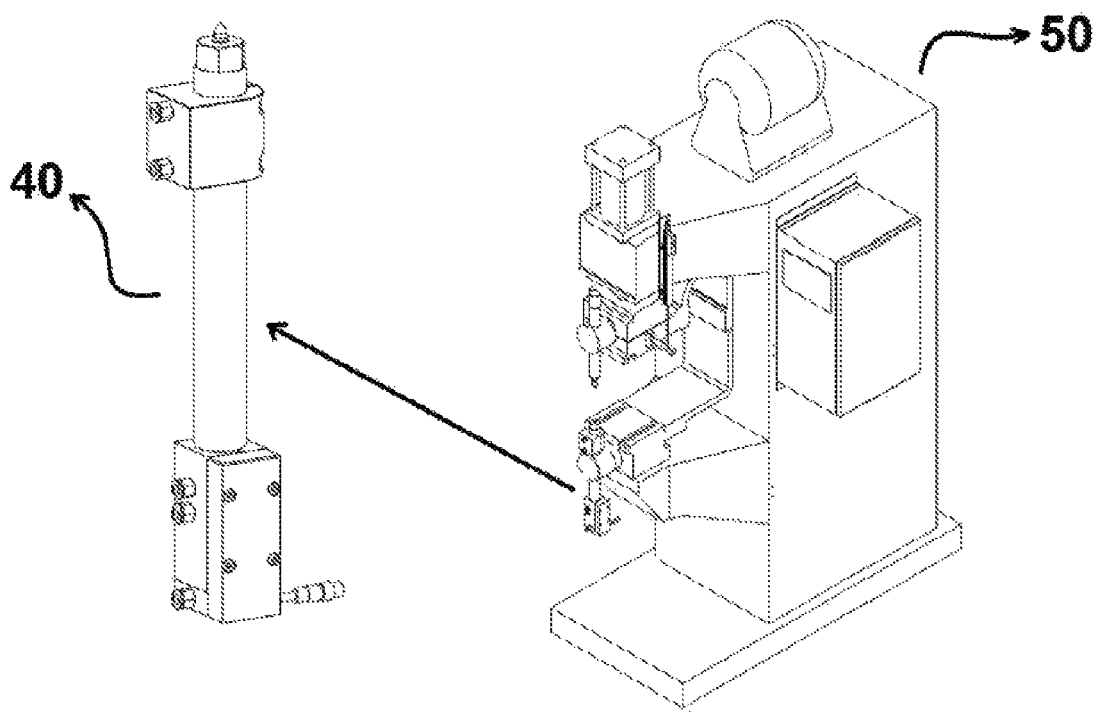
FIG. 4: A representative perspective view of a resistance welding machine comprising the rutile type electrode assembly according to system of the present invention.
Figure 5:
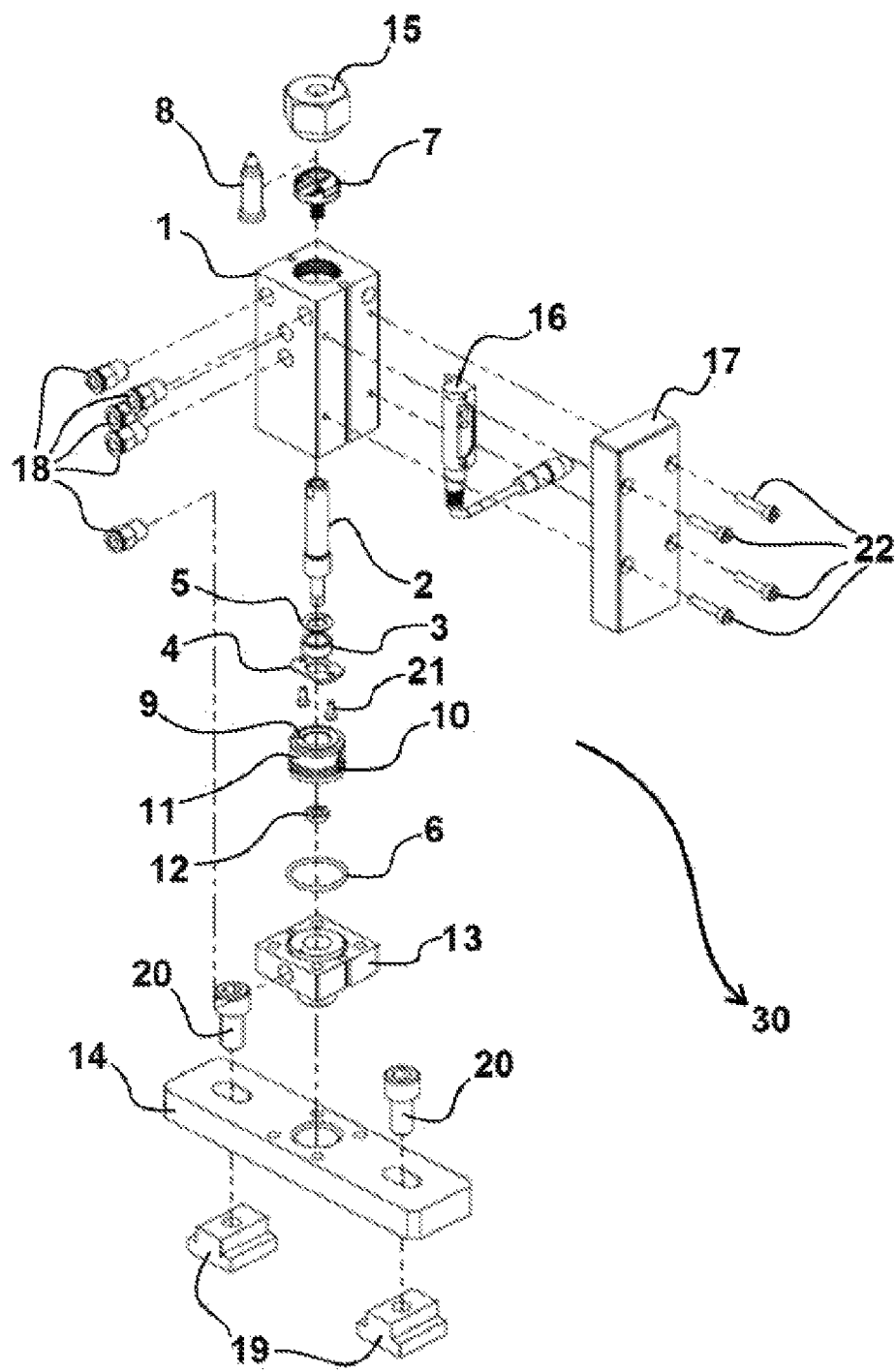
FIG. 5: A representative disassembled view of the electrode assembly connected to the projection table in the system according to the invention.
Figure 6:
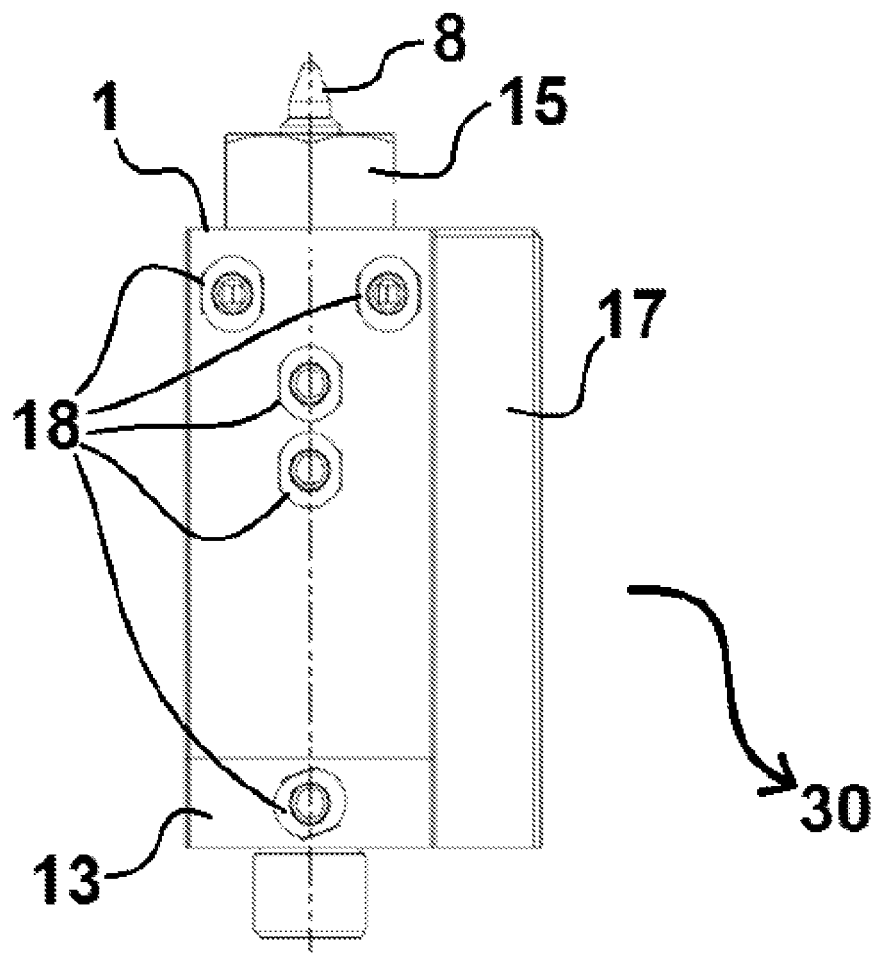
FIG. 6: A representative frontal view of the electrode assembly connected to the projection table in the system according to the invention.
Figure 7:
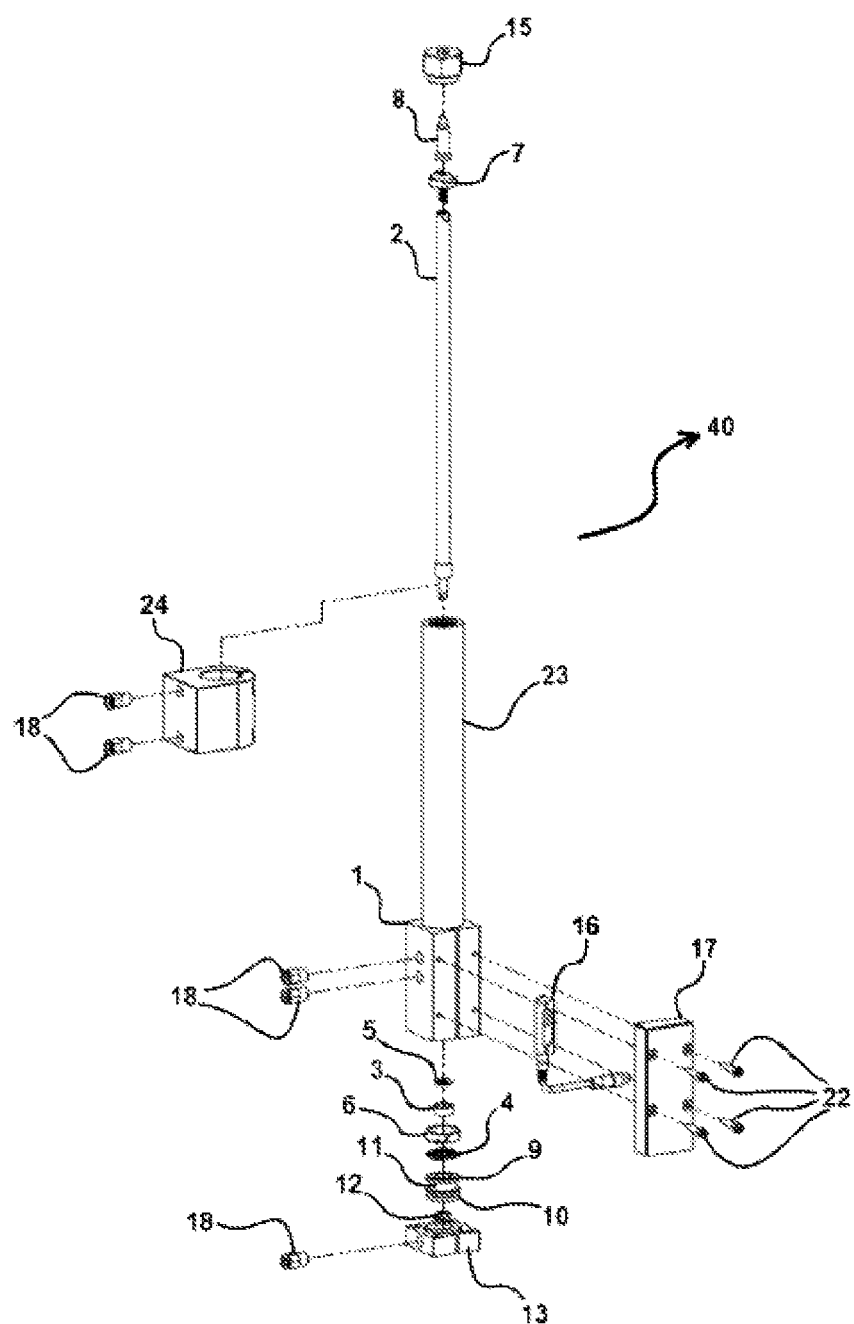
FIG. 7: A representative disassembled view of the rutile type electrode assembly according to the present invention.

The equivalents of the reference numbers shown in the figures are provided below.
1. Electrode body
2. Piston rod
3. felt
4. felt washer
5. First sealing member
6. Second sealing member
7. Pin holder
8. Ceramic pin
9. Piston rod head
10. Piston seal
11. Magnetic band
12. Connecting element
13. Bottom cover
14. Adapter
15. Electrode
16. Sensor
17. Sensor cover
18. Sleeve
19. T connector
20. Fixing bolt
21. Felt/seal ring bolt
22. Sensor cover bolt
23. Extension member
24. Cooling block
30. Electrode assembly with projection table connection
40. rutile type electrode assembly
50. Resistance welding machine
60. Nut supply unit
61. Nut Box
62. Pneumatic valve with cylinder group

DETAILED DESCRIPTION OF THE INVENTION

The preferred alternatives of the resistance welding system for nut control in the following detailed description are provided to ensure a better understanding and shall not create any restrictive effect.

The present invention relates to a resistance welding system for nut control; the resistance welding system uses a resistance welding method in the process of welding nuts to metal sheets; detects the situations of the parameters are in or out of tolerance values that the parameter can be nut lengths, nut inner diameter differences and acceptability of welding seam riser heights, by makes control them at the welding process and gives warning according to situation; enables automatic control to different types of nuts on a component in processes where multiple nuts are welded onto one component by maintaining a recipeable and sequential welding process via calling registered welding properties for the corresponding nut; it also relates to a resistance welding nut control system that prevents the operator from taking the wrong nut and loading it into the machine.

The system according to the invention has: at least one electrode body (1) for supporting the cooling elements and supporting the cooling channels; at least one ceramic pin (8) for centering by bringing the pieces to be welded to the same axis; at least one piston rod (2) to convert the pneumatic movement within the electrode body (1) to mechanical movement and to move the ceramic pin (8); at least one felt (3) to provide resistance to heat and dust and consequently allow the system to operate for a long time; at least one felt washer (4) to secure the felt (3); at least one first sealing member (5) and at least one second sealing member (6) for sealing; at least one pin holder (7) to provide up and down movements of the ceramic pin (8) without gap; at least one magnetic band (11) to indicate positions that enable to understand the movement of the mechanism digitally; at least one sensor (16) that allow to understanding the data from the magnetic band (11) as the analog position value; at least one sensor cover (17) to protect the sensor (16) from external effects; at least one piston rod head (9) to connecting the sealing elements with the magnetic band (11) and also to move the ceramic pin (8) in both directions up and down; at least one piston seal (10) for efficient operation by preventing air leaks; at least one connecting element (12) for connecting the sealing elements with the magnetic band (11); at least one bottom cover (13) to prevent air leakage and dust ingress; at least one adapter (14), at least one T connector (19) and least one fixing bolt (20) for connecting the electrode assembly with projection table connection (30) to any machine; at least one electrode (15) to making welding process; at least one sleeve (18) to ensure air and water connections; at least one resistance welding machine (50) which has at least one electrode assembly with projection table connection (30) with sensor cover bolt (22) for connection to sensor cover (17) or, optionally has at least one rutile type electrode assembly (40); at least one nut supply unit comprises that the nut boxes (61) holding the nuts to be welded and closing/opening according to the commands from the programmable logical controller (PLC) and pneumatic valve with cylinder groups (62) to allow opening and closing of these nut boxes (61) according to the commands given by PLC. Rutile type electrode assembly (40) comprises at least one additional extension member (23) and at least one cooling block (24) relative to electrode assembly with projection table connection (30).

With the commands given by PLC according to the sequence and program in the welding process, the nut box (61) of the nut type to be welded is opened and the other nut boxes (61) are kept in the closed position. Thus, this process prevents the operator from getting and loading the wrong nut. The covers of the nut boxes (61) are transparent and this way can be seen how much nut remains in the closed position of nut boxes (61). As a safety precaution, the covers of the nut boxes (61) do not continue to close in the event of an obstacle, thereby this is eliminating that pinch the operator's hand. Programmable logic controller (PLC) is used to ensure that all welding and nut control operations are evaluated and performed automatically.

According to the invention; the system has receiptable, sortable automatic welding feature, it is provided by PLC to call the registered welding properties for the next nut and to check the nuts according to the registered measured values in the operations where more than one nut is welded on a single piece. Thus, the automatic control of the numerous and different types of nuts on the piece is ensured and, the situation of missing nut or welding extra nut is prevented.

In the system subject to the invention: with measuring downward movement of the nut placed on the ceramic pin (8) to be welded to the metal piece via movement of the upper electrode, the magnetic band (11) on the piston rod (2) which moves downwards with the ceramic pin (8) is detected by the sensor (16) and, the position of the magnetic band (11) is sent analogously from the sensor (16) to the PLC. During the selection of "correct nut and the correct welding process" the height of the ceramic pin (8) before and after welding is registered by the PLC in the learning cycle and the measurements obtained in subsequent welding operations are compared with these registered values. The distance information that measuring the upper electrode position read from the optical and/or linear scale systems are controlled simultaneously with this process. Thus, controls are performed by way of both monitoring ceramic pin (8) movement and upper electrode movements.

The invention claimed is:

1. A resistance welding nut control system comprising:
   an electrode assembly comprising:
      an electrode body that supports cooling elements and cooling channels;
      a ceramic pin that centers pieces to be welded by bringing them to a same axis;
      a piston rod that converts pneumatic movement within the electrode body to mechanical movement and to move the ceramic pin;
      a pin holder that provides up and down movements of the ceramic pin without gap;
      a magnetic band that indicates positions that enable digital understanding of ceramic pin movement;
      a sensor that reads data from the magnetic band as an analog position value;
      a piston rod head that connects sealing elements with the magnetic band and to move the ceramic pin in both upward and downward directions;
      an electrode that performs welding operations; and
      a sleeve that ensures air and water connections;
   a programmable logical controller to:
      control welding and nut control operations;
      collect periodical and statistical data of welding operations;
      call registered welding process properties for subsequent nuts when welding multiple nuts on one piece;
      check nuts according to registered measured values; and
      evaluate data from the sensor and at least one optical or linear scale system, wherein the at least one optical or linear scale system:
         controls measurements during welding operations;
         measures upper electrode position linearly; and
         measures a height of the ceramic pin; and
   a nut supply unit comprising:
      a plurality of nut boxes; and
      at least one pneumatic valve with a plurality of cylindrical groups that control an opening and closing of the nut boxes according to commands from the programmable logical controller.

2. The resistance welding nut control system according to claim 1, wherein the electrode assembly further comprises:
   a felt portion that provides resistance to heat and dust;
   a felt washer that secures the felt portion;
   a first sealing member and a second sealing member that provide sealing;
   a sensor cover that protects the sensor from external effects;
   a piston seal that prevents air leaks;
   a connecting element that connects the sealing elements with the magnetic band;
   a bottom cover that prevents air leakage and dust ingress; and
   a sensor cover bolt that connects to the sensor cover.

3. The resistance welding nut control system according to claim 1, wherein the nut boxes comprise transparent covers that allow visual inspection of nut quantity.

4. The resistance welding nut control system according to claim 1, wherein the nut boxes comprise covers that stop closing movement upon detecting an obstacle.

* * * * *